United States Patent [19]

Tajiri

[11] 4,110,793

[45] Aug. 29, 1978

[54] DEFLECTION YOKE

[75] Inventor: Atsufumi Tajiri, Yokohama, Japan

[73] Assignee: Denki Onkyo Co., Ltd., Tokyo, Japan

[21] Appl. No.: 751,729

[22] Filed: Dec. 17, 1976

[30] Foreign Application Priority Data

Dec. 17, 1975 [JP] Japan ................................ 50/171174

[51] Int. Cl.[2] ................................................ H04N 5/64

[52] U.S. Cl. ...................................... 358/248; 335/210

[58] Field of Search ........................ 359/248, 242, 227; 335/210

[56] References Cited

U.S. PATENT DOCUMENTS

| | | | |
|---|---|---|---|
| 3,671,894 | 6/1972 | Sawada ................................ | 358/248 |
| 3,786,185 | 1/1974 | Shrader ................................ | 358/248 |

*Primary Examiner*—Robert L. Griffin
*Assistant Examiner*—Edward L. Coles
*Attorney, Agent, or Firm*—Armstrong, Nikaido, Marmelstein & Kubovcik

[57] ABSTRACT

A deflection yoke is supported against the wall of a cathode ray tube by using adjusting bolts which threadably engage a plurality of threaded bores formed in a front surface of a coil separator of the deflection yoke so that the inclination of the deflection yoke can be adjusted when a front portion of the yoke is removed from the tube.

7 Claims, 5 Drawing Figures

DEFLECTION YOKE

BACKGROUND OF THE INVENTION

The invention relates to a deflection yoke for use in a television receiver, and in particular, to a deflection yoke which permit its inclination relative to a cathode ray tube to be adjusted and hence is preferred for use in a color television receiver.

Three electron guns in a cathode ray tube are disposed at proper angles so that they are focussed at the center of a shadow mask. For example, three electron guns in an in-line array are disposed on a common horizontal plane in a manner such that beams therefrom accurately impinge on three dots of red, green and blue color located adjacent to each other at the center of a screen.

However, in cathode ray tubes which are in practical use, it is difficult to locate and secure the electron guns in this accurate position and array during the assembly, but a certain tolerance must be accommodated for, with consequence that when a deflection yoke is mounted on the neck of the cathode ray tube and placed against the bulb portion thereof before it is secured, the three electron beams from the three electron guns may not impinge correctly upon predetermined color dots. Thus a convergence distortion results. The convergence can be greatly improved by an adjustment of the inclination of the deflection yoke itself or the inclination of the axis of the deflection yoke relative to the axis of the cathode ray tube.

At this end, U.S. Pat. No. 3,921,110 issued to H. Ishii et al and entitled "Deflection Yoke Holding Device" discloses the use of a holder mounted on the front of a deflection yoke and which permits the deflection yoke to be secured in any inclination so as to correct a convergence distortion in order to produce an optimum raster. However, the use of such a holder results in an increase in the cost of the deflection yoke.

SUMMARY OF THE INVENTION

It is an object of the invention to provide a deflection yoke having a simplified mechanism for adjusting the inclination of the deflection yoke.

It is another object of the invention to provide a deflection yoke which dispenses with any attachment separate from the deflection yoke.

It is a further object of the invention to provide an inexpensive deflection yoke which permits an adjustment of its inclination in order to improve the convergence.

In accordance with the invention, a coil separator which is interposed between a horizontal deflection coil and a vertical deflection coil of a deflection yoke is formed with three or four threaded bores which extend in a direction toward the wall of a cathode ray tube. The bores are engaged by threaded, adjusted bolts, which are screwed to move toward the tube wall until they bear against the tube wall to determine the inclination of the front of the deflection yoke. At the rear end of the deflection yoke, the coil separator is provided with a plurality of tongues, which are clamped against the neck of the cathode ray tube by means of a clamping band. Thus, the combined use of the adjusting bolts and the clamping band permits the inclination of the axis of the deflection yoke relative to the tube axis to be determined in a manner in which the convergence is improved.

DETAILED DESCRIPTION OF PREFERRED EMBODIMENTS

Figure 1:
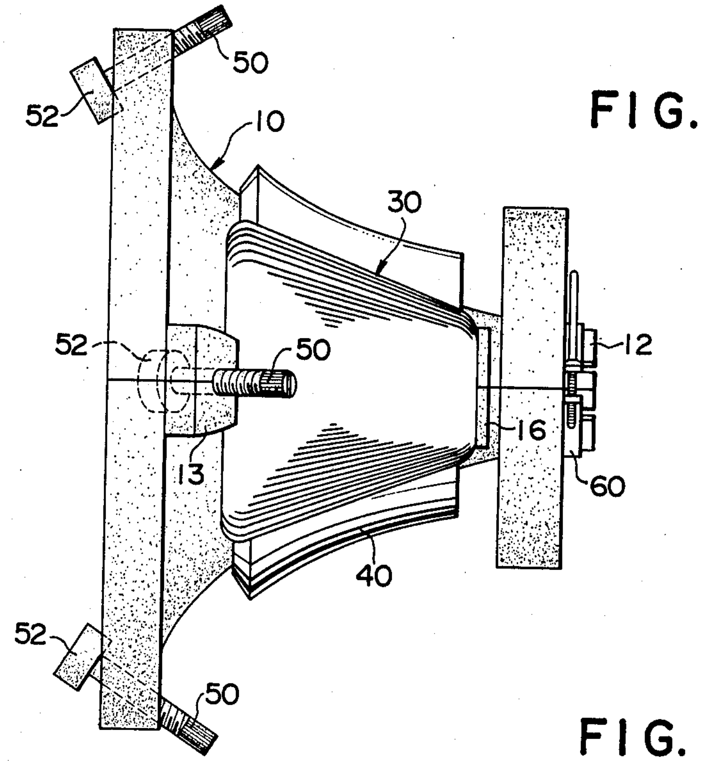
FIG. 1 is a side elevation of the deflection yoke of the invention.

Referring to FIGS. 1 to 4, there is shown a flared, coil separator 10 which is interposed between an inner horizontal deflection coil 20 of a saddle configuration and an outer vertical deflection yoke 30. On its inside, the separator 10 is provided with a pair of ribs 11 which extend along the axis of a cathode ray tube for providing a separation between horizontal deflection coils 20, 20. The front end of each rib 11 is formed with a flat portion 17 of an increased wall thickness. In a region corresponding to an opening 24 formed in the respective horizontal coils 20, parts of the coil separator 10 are formed with extensions 15 along which they are joined together, forming a portion 14 of an increased thickness to provide a structural reinforcement. Adjacent to the front end thereof, the portion 14 is formed with an outwardly projecting mount 13. Adjacent to the rear end, the coil separator 10 is provided with an upright piece 16, and the rear end of the separator 10 is formed with a plurality of tongues 12, which are shaped to fit around the neck of a cathode ray tube and which are clamped against the neck by means of a clamping band 60 to fixedly mount the deflection yoke on the neck.

Figure 2:
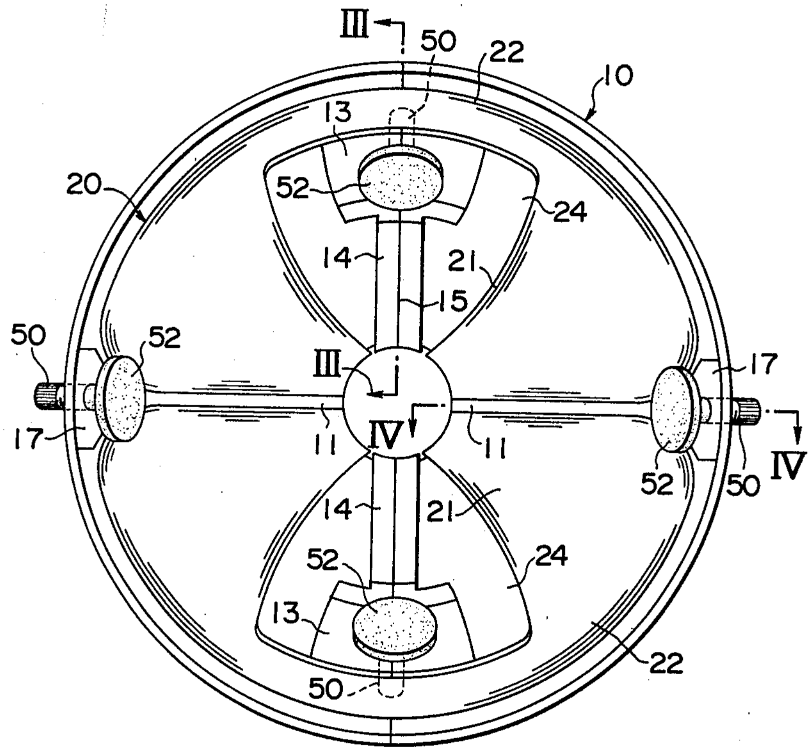
FIG. 2 is a front view of the deflection yoke.
Figure 4:
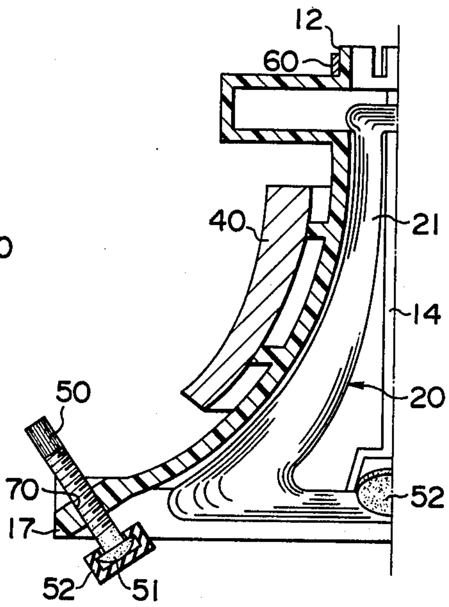
FIG. 4 is a cross section taken along the line IV-IV shown in FIG. 2.

As shown in FIGS. 2 and 4, the horizontal deflection coil 20 is shaped in a saddle configuration, and includes a pair of active conductor portions 22, and a front and a rear end coil 22, 23 which join the front and ends of the conductor portions. The opening 24 is formed between the conductor portions and the end coils.

Figure 3:
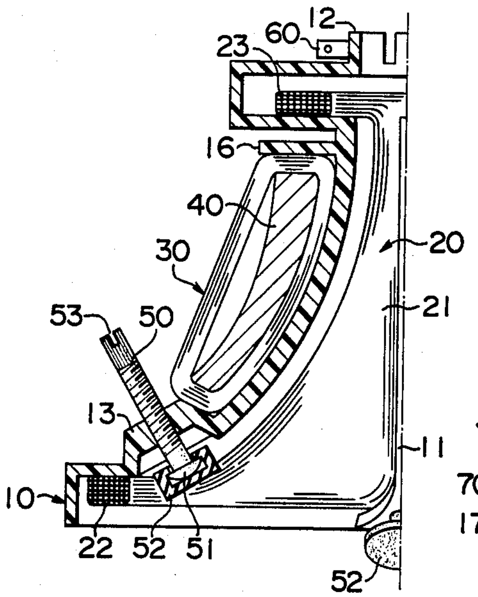
FIG. 3 is a cross section taken along the line III-III shown in FIG. 2.

As shown in FIGS. 1 and 3, the vertical deflection coil 30 comprises an annular ferrite core 40 of flared form carrying a toroidal winding thereon, and is secured between the upright piece 16 and the mount 13 on the outside of the coil separator 10. The mount 13 and the flat portion 17 of the coil separator 10 are formed with threaded bores 70, which are engaged by threaded, adjusting bolts 50. The bolts 50 may be independently turned to move toward or way from the tube wall. A hemi-spherical head 51 is provided on the front end of the adjusting bolt 50 and assures a uniform pressure regardless of the angle which the bolt 50 makes with the tube wall as it bears against the latter. A rubber cap 52 cover the head 51 of the bolt 50 to prevent damage to the tube wall. The other end of the bolt 50 is formed with a groove 53 allowing insertion of the tip of the screwdriver.

When mounting the deflection yoke on the cathode ray tube, the adjusting bolts 50 are withdrawn, with the head 51 being received inside the mount 13, whereby the surface of the horizontal deflection coils 20 can bear against the wall of the cathode ray tube. After inserting the deflection yoke upon the neck of the cathode ray tube and deciding an optimum position of the yoke, the clamping band 60 is tightened to secure the tongues 12 against the neck. An optimum inclination of the front portion of the deflection yoke is then determined, and the adjusting bolts 50 are turned until their caps 52 bear against the tube wall. When all of the four bolts 52 are adjusted, the deflection yoke becomes immovable relative to the cathode ray tube, achieving an improved convergence.

Figure 5:
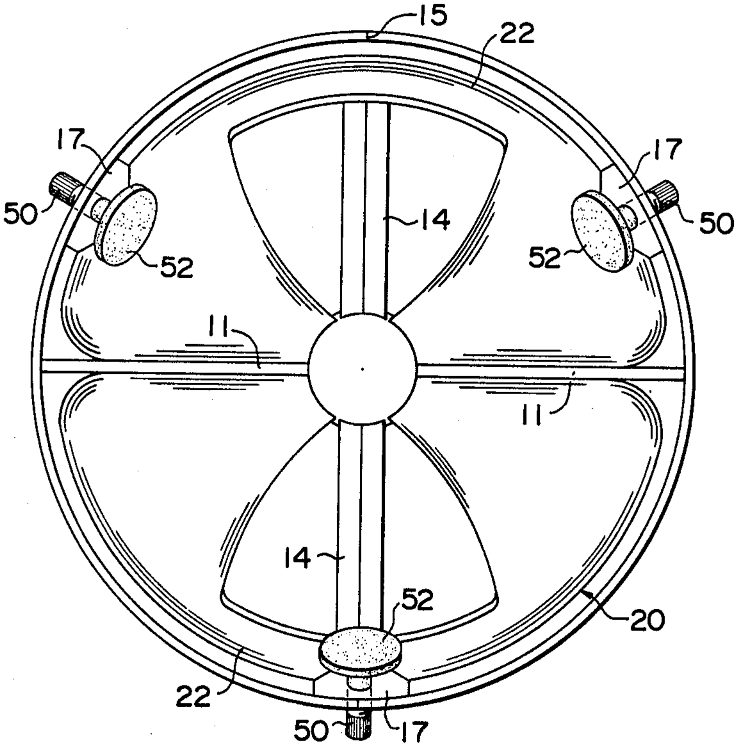
FIG. 5 is a front view of another embodiment of the invention.

FIG. 5 shows another embodiment of the invention. The only difference over the embodiment of FIG. 2 is that all of the threaded bores 70 are formed in the flat portion 17 at points which are spaced apart 120° from each other. In this arrangement, three of the adjusting bolts 50 may be used to adjust and fix the inclination of the deflection yoke in the similar manner as in FIG. 2.

Having described the invention, what is claimed is:

1. A deflection yoke comprising a horizontal deflection coil of a saddle configuration, a vertical deflection coil having an annular core carrying a toroidal winding thereon, a coil separator interposed between the deflection coils and having a plurality of tongues formed at the rear end thereof, the tongues being adapted to surround a neck of a cathode ray tube, a band for clamping the tongues against the neck, at least three threaded bores formed in a front portion of the coil separator at a given interval about the axis of the deflection yoke and extending in a direction toward the wall of the cathode ray tube, and adjusting bolt means having a threaded portion threadably engaging the threaded bores and a head portion directly contacting the tube, the bolt means being turned to adjust the inclination of the deflection yoke with respect to the cathode ray tube.

2. A deflection yoke according to claim 1 in which the coil separator comprises a pair of separator halves each having a portion of an increased thickness along which the halves are joined together.

3. A deflection yoke according to claim 1 in which the three threaded bores are arranged at an interval of 120°.

4. A deflection yoke according to claim 1 in which four threaded bores are arranged at an interval of 90°.

5. A deflection according to claim 4 in which a pair of oppositely located threaded bores are each located within an opening formed by the horizontal deflection coil.

6. A deflection yoke according to claim 1 wherein the head portion of said bolt means is semi-spherical in configuration.

7. A deflection yoke according to claim 6 in which a rubber cap covers the semi-spherical head portion.

* * * * *